(12) United States Patent
Wakabayashi et al.

(10) Patent No.: US 6,435,992 B2
(45) Date of Patent: Aug. 20, 2002

(54) TENSIONER WITH PLUNGER STOPPER PIN

(75) Inventors: Naoki Wakabayashi; Katsuya Nakakubo, both of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 28 days.

(21) Appl. No.: 09/727,208

(22) Filed: Nov. 30, 2000

(30) Foreign Application Priority Data

Nov. 30, 1999 (JP) ............................................. 11-340379

(51) Int. Cl.$^7$ .............................. F16H 7/08; F16H 7/22
(52) U.S. Cl. ....................... 474/101; 474/138; 474/110; 474/111
(58) Field of Search ................................ 474/101, 104, 474/111, 140, 110, 109, 112, 138; 403/286, 341, 293, 326, 374.3, 355

(56) References Cited

U.S. PATENT DOCUMENTS

| 3,268,260 A | * | 8/1966 | Snipe ......................... 403/355 |
| 3,952,433 A | * | 4/1976 | Heinold et al. .............. 403/318 |
| 5,090,946 A | * | 2/1992 | Futami et al. ............... 474/110 |
| 5,579,959 A | * | 12/1996 | Bennett et al. .............. 222/385 |
| 5,676,614 A | * | 10/1997 | Inoue et al. ................. 474/110 |
| 5,997,272 A | * | 12/1999 | Leonardo et al. ........... 425/190 |
| 6,314,833 B1 | * | 11/2001 | Pillsbury, IV ............ 403/374.3 |

FOREIGN PATENT DOCUMENTS

| JP | 07-042804 | | 2/1995 |
| JP | 7317854 A | | 12/1995 |
| JP | 08-121557 | * | 5/1996 |
| JP | 09-119489 | | 5/1997 |

* cited by examiner

Primary Examiner—David A. Bucci
Assistant Examiner—Marcus Charles
(74) Attorney, Agent, or Firm—Dann, Dorfman, Herrell and Skillman; Henry H. Skillman

(57) ABSTRACT

A tensioner has a substantially U-shaped stopper pin hooked at opposite end parts on a tensioner body and part of a plunger, respectively, to keep the plunger in a retracted position against the force of a spring before the tensioner is mounted to an engine body at an appropriate position relative to a power transmitting chain.

10 Claims, 2 Drawing Sheets

TENSIONER WITH PLUNGER STOPPER PIN

BACKGROUND OF THE INVENTION

1. Field of the Invention

The present invention relates generally to a tensioner for applying an appropriate tension to a timing chain or timing belt of an engine, and more particularly to a tensioner equipped with a plunger stopper pin that holds a spring-loaded plunger in position against movement in a direction projecting from the tensioner body before the tensioner is assembled to the engine.

2. Description of the Related Art

A tensioner is used with a timing chain arranged to transmit a power between a crankshaft and a camshaft of an engine. The tensioner has a plunger that is urged by a spring to thrust outward from the tensioner body. When the tensioner is to be assembled to the engine, the plunger is needed to be pushed inside the tensioner body in advance against the force of the spring.

Accordingly, in the tensioner disclosed in the Japanese Patent No. 2895784, a stopper pin is inserted through a pin hole in the tensioner body into a pin hole in the plunger to thereby lock the plunger in position against the movement in a direction projecting from the tensioner body.

Another tensioner disclosed in the Japanese Patent Laid-open Publication No. HEI-7-42804 includes a plunger having a annular pin stopper groove formed therein, and a stopper pin inserted through a hole in the tensioner body into the pin stopper groove until a front end of the pin is caught by a side wall of the pin stopper groove. Thus, the plunger is prevented from thrusting out.

However, since the stopper pins used in the conventional tensioners comprise a needle-like stopper pin, the pin hole or the pin stopper groove formed in the plunger must be aligned with the pin hole in the tensioner body before the needle-like stopper pin is inserted. When the stopper pin is inserted through from the outside of the plunger or the outside of the tensioner body, the pin hole on the tensioner body or the pin stopper groove on the plunger lies in hiding. This makes it impossible to visually confirm the position of the pin hole or the pin stopper groove. Accordingly, it is very difficult to carry out the work to insert the stopper pin therein, and a great deal of time has been required for the work to insert the stopper pin.

Further, in the conventional tensioner having an annular pin stopper groove formed in the plunger, the man-hour to form the stopper groove is additionally needed.

SUMMARY OF THE INVENTION

It is therefore an object of the invention to provide a tensioner having structural features which can hold a plunger onto a tensioner body with a simple structure.

Another object of the invention is to provide a tensioner having a stopper that can be easily mounted to the tensioner body by a visual confirmation.

A further object of the invention is to provide a tensioner capable of easily holding a plunger to the tensioner body by a stopper pin, utilizing the shape and structure of an existing component.

According to the present invention, there is provided a tensioner comprising: a tensioner body; a plunger slidably mounted on the tensioner body and normally urged in a direction to project outward from the tensioner body; and a substantially U-shaped stopper pin having opposite end parts hooked on a part of the tensioner body and a part of the plunger, respectively, to hold the plunger in position against movement in the direction to project from the tensioner body.

In one preferred form of the invention, the tensioner body has a pin retaining hole formed in an outer surface thereof and extending perpendicularly to the axis of the plunger, and the plunger has a plastic shoe provided as an integral part on a front end of the plunger, the shoe having a pin retaining hole formed therein and extending perpendicularly to the axis of the plunger. One of the opposite end parts of the U-shaped stopper pin is engaged in the pin retaining hole in the tensioner body, and the other end part of the U-shaped stopper pin is engaged in the pin retaining hole in the shoe.

It is preferable that the stopper pin is formed from a resilient metal wire. The pin retaining hole in the tensioner body has a diameter slightly larger than the diameter of the metal wire of the stopper pin, and the retaining hole in the shoe is a rectangular hole much larger in diameter than the metal wire of the stopper pin.

When the plunger is to be locked in its retracted position, the plunger is pushed into the tensioner body, then the stopper pin is attached to the tensioner body and the shoe such that the opposite end parts of the stopper pin are engaged in the respective pin retaining holes of the tensioner body and the shoe. Since the pin retaining holes are formed on the outside surfaces of the tensioner body and the shoe, the pin attachment work can be easily achieved under visual observation. The pin retaining hole in the shoe is much larger in diameter than the stopper pin. This facilitates smooth attachment of the stopper pin to the shoe.

When the U-shaped stopper pin is in its free state, the opposite end parts of the stopper pin may be inclined toward each other. The inclined opposite end parts can exert an increased retaining force on the plunger.

The U-shaped stopper pin further has a center part extending between the opposite end parts. The center part is spaced from the tensioner body and the shoe in a radial direction of the plunger. The center part thus arranged can be easily gripped when the stopper pin is to be removed from the tensioner.

In another preferred form of the invention, the tensioner body has a pin retaining hole formed in an outer surface thereof and extending perpendicularly to the axis of the plunger, and the plunger has a pin retaining hole formed in an outer surface thereof and extending perpendicularly to the axis of the plunger. One of the opposite end parts of the U-shaped stopper pin is engaged in the pin retaining hole in the tensioner body, and the other end part of the U-shaped stopper pin is engaged in the pin retaining hole in the plunger. The pin retaining hole in the tensioner body and the pin retaining hole in the plunger may have a diameter slightly larger than the diameter of the metal wire of the stopper pin, and the opposite end parts of the stopper pin may be parallel to each other.

In a further preferred form of the invention, the tensioner body has a pin retaining hole formed in an outer surface thereof and extending perpendicularly to the axis of the plunger, and the plunger has a front end face extending perpendicularly to the axis of the plunger. One of the opposite end parts of the U-shaped stopper pin is engaged in the pin retaining hole in the tensioner body, and the other end part of the U-shaped stopper pin is engaged on the front end face of the plunger.

The stopper pin may have a center part extending between the opposite end parts and looped to form a rink-like pull tab. The ring-like pull tab facilitate the stopper pin removing work.

The above and other objects, features and advantages of the present invention will become apparent to those versed in the art upon making reference to the following detailed description and accompanying sheets of drawings in which a preferred structural embodiment of the present invention is shown by way of illustrative example.

DETAILED DESCRIPTION OF THE PREFERRED EMBODIMENTS

Figure 1:
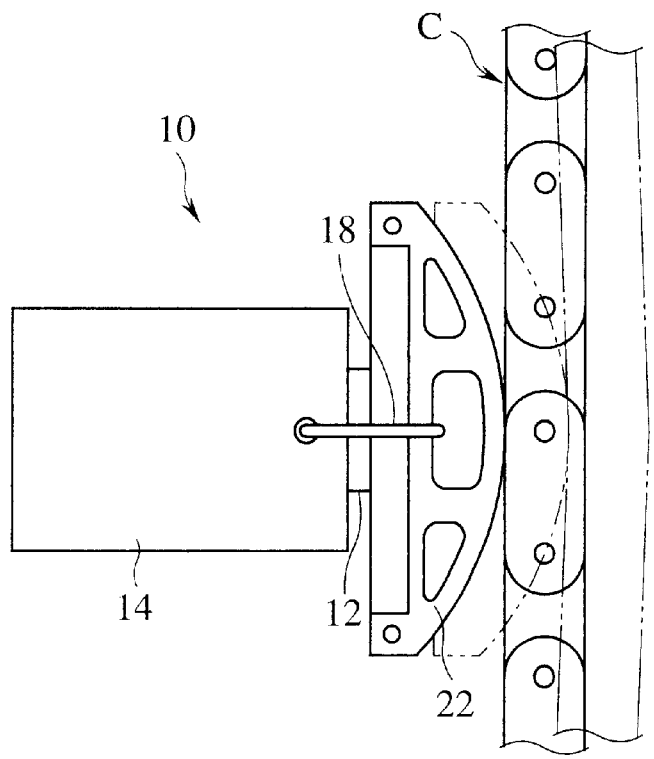
FIG. 1 is a front view of a tensioner according to a first embodiment of the present invention.
Figure 2:
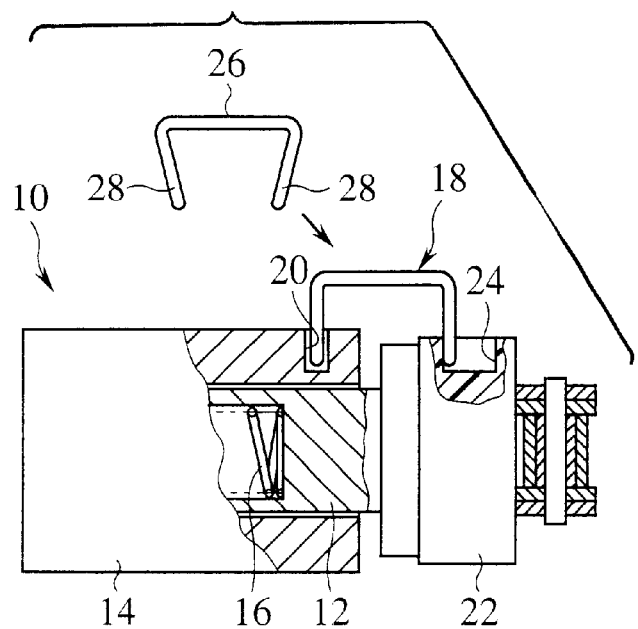
FIG. 2 is a sectional view of the tensioner shown in FIG. 1.

Certain preferred structural embodiments of the present invention will be described with reference to the accompanying drawings. FIG. 1 and FIG. 2 illustrate a tensioner according to a first embodiment of the present invention.

As generally known, the tensioner has a function to adjust a tension in a chain or a belt or the like. In case of an automobile engine, for example, a chain is wound around a crank sprocket and a cam sprocket, and the tensioner is used in order to prevent the chain from a slack and apply a constant tension to the chain.

As shown in FIGS. 1 and 2, a tensioner 10 is provided with a plunger 12 having a thrusting force applied thereto in order to apply a tension to a chain C. The plunger 12 is slidably fitted in a cylindrical hollow part of a tensioner body 14. Between the plunger 12 and the tensioner body 14 is disposed a compression coil spring 16 that applies a thrusting force to the plunger 12. Accordingly, the plunger 12 is needed to be pushed or forced into the tensioner body 14 against the force of the spring 16, when the tensioner 10 is mounted on a fixed member such as an engine block (not shown).

According to the present invention, use of a specific stopper pin 18 and a structure related to the stopper pin 18 enables easy assembling and disassembling of the stopper pin 18 relative to the tensioner 10, as will be described below.

As shown in detail in FIG. 1 and FIG. 2, the tensioner body 14 has a pin retaining hole 20 (FIG. 2) formed on an outer surface thereof. The plunger 12 has a plastic shoe 22 on the front end thereof, and the shoe 22 has a pin retaining hole 24 formed thereon. The stopper pin 18 is pinned in the pin retaining holes 20 and 24, thereby locking the plunger 12 in position against movement in a direction projecting from the tensioner body 14.

The pin retaining hole 20 formed in the tensioner body 14 is a blind hole extending perpendicularly to the circumference of the tensioner body 14. The pin retainer hole 20 extends in a radial direction of the cylindrical hollow part of the tensioner body 14 in which the plunger 12 is slidably movable. The pin retaining hole 24 formed in the plunger 12 is a bottomed relatively large rectangular hole formed at the same time the plastic shoe 22 is molded. The pin retaining hole 24 extend in a radial direction the plunger 12.

The stopper pin 18 is formed from a resilient metal wire in a substantially U shape with opposite end parts slightly converged. The stopper pin 18 has a center part 26 and a pair of end parts 28, 28. The length of the end parts 28 is greater than the depth of the pin retaining holes 20, 24 so that after the stopper pin 18 is mounted onto the plunger 12 and the tensioner body 14, the center part 26 stays with a certain gap from the surfaces of the plunger 12 and the tensioner body 14.

As shown in FIG. 2, when the plunger 12 is pushed inside to hook the stopper pin 18 in the pin retaining holes 20, 24, both of the pin retaining holes 20, 24 can be confirmed visually. This makes the pin-mounting work easier than the conventional. Further, since the pin retaining hole 24 in the plunger 12 is a relatively large rectangular hole formed integrally with the plastic shoe 22, one end part 28 of the stopper pin 18 can be easily hooked into the pin retaining hole 24 without alignment with high positioning accuracy.

After the tensioner 10 is mounted onto an engine block or the like fixed member, since the center part 26 of the stopper pin 18 stays floating or spaced from the plunger 12 and the tensioner body 14, the stopper pin 18 can easily be removed by pulling the center part 26 outward away from the plunger 12 and the tensioner body 14. Upon detachment or removal of the stopper pin 18, the plunger 12 is extruded by the compression spring 16 to an operating position in which the shoe 22 can exert an appropriate tension to the chain C.

Figure 3:
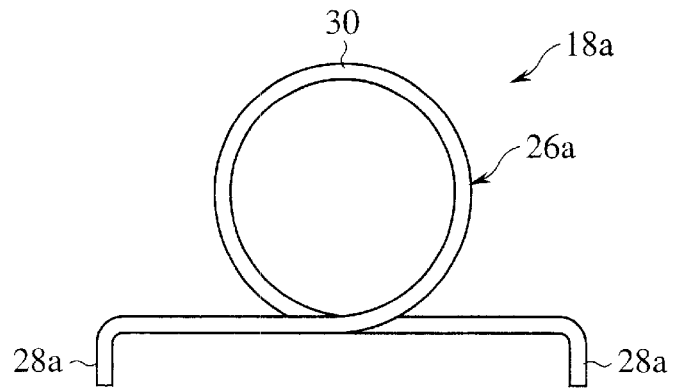
FIG. 3 is a front view of a modified stopper pin according to the present invention.

FIG. 3 illustrates a modified form of the stopper pin. The modified stopper pin 18a has a center part 26a looped to form a ring-shaped pull tab 30 for facilitating removal or detachment of the stopper pin 18a from the tensioner. When the stopper pin 18a is to be removed, the ring-shaped pull tab 30 is pulled outward with a finger hooked thereon. Opposite end parts 26a of the stopper pin 18a are bent perpendicularly from both sides of the center part 26a. The length of the front parts 28a is sufficient with such a length that it can be hooked in the pin retaining holes 20, 24.

Figure 4:
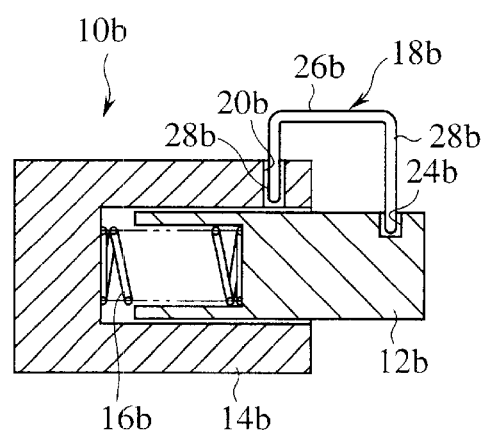
FIG. 4 is a sectional view of a tensioner according to a second embodiment of the present invention.

FIG. 4 is a sectional view of a tensioner according to a second embodiment of the present invention. The tensioner 10b includes a plunger 12b, a tensioner body 14b, and a compression coil spring 16b in the same manner as the tensioner 10 shown in the first embodiment.

The tensioner body 14b has a pin retaining hole 20b formed in an outer surface thereof, the plunger 12b also has a pin retaining hole 24b formed in an outer surface thereof. The pin retaining hole 20b of the tensioner body 14b is a radial through hole in this embodiment, however it may be a blind hole in the same manner as in the first embodiment. The pin retaining hole 24b of the plunger 12b is a radial blind hole. The pin retaining holes 20b, 24b are perpendicular to outer surfaces of the tensioner body 14b and the plunger 12b. More specifically, the pin retaining holes 20b, 24b are perpendicular to the axis of the plunger 12b.

A stopper pin 18b is formed by bending a metal wire into a generally U shape having a center part 26b and opposite end parts 28b, 28b bent perpendicularly from both sides of the center part 26b. One end part 28b is made longer than the other end part so that it can be pinned in the pin retaining hole 24b on the plunger 12b. In this embodiment, each of the pin retaining holes 20b, 24b has a slightly larger diameter than the wire diameter of the stopper pin 18b, and the end parts 28b, 28b are formed parallel to each other, accordingly.

In the tensioner 10b of the second embodiment, the plunger 12b comes in contact with a shoe provided on a mating part. Thus, the plunger 12b has the pin retaining hole 24b formed in itself. When the plunger 12b is not provided with the shoe in this manner, the plunger 12b is so formed as to have a pin retaining hole 24b so that the generally U-shaped stopper pin 18b can be used for locking the plunger 12b in position against movement in a direction to project from the tensioner body 14b.

Figure 5:
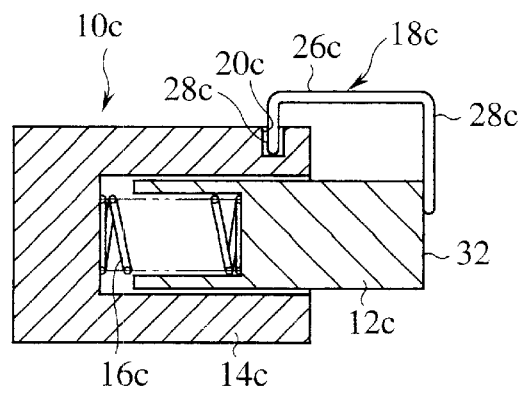
FIG. 5 is a sectional view of a tensioner according to a third embodiment of the present invention.

FIG. 5 shows in cross sectional a tensioner according to a third embodiment of the present invention. The tensioner 10c includes a plunger 12c, a tensioner body 14c, and a compression coil spring 16c in the same manner as in the first embodiment.

The tensioner body 14c has a blind pin retaining hole 20c formed in an outer surface thereof. The plunger 12c is not provided with a pin retaining hole in an outer surface thereof. A stopper pin 18c is formed in a substantially U shape with a center part 26c and opposite end parts 28c, 28c bent perpendicularly from both ends of the center part 26c. In this embodiment, a front end face 32 of the plunger 12c is formed flat, and the one end part 28c of the substantially U-shaped stopper pin 18c is hooked in the pin retaining hole 20c, and the other end part 28c is hooked on the front face 32 of the plunger 12c.

Since the plunger 12c has no pin retaining hole formed therein, the mechanical strength of the plunger 12c is higher than those shown in FIGS. 1 and 4. It is also possible to save the man-hour to make the pin retaining hole. In this embodiment, a stopper pin having end parts converged each other in the same manner as the first embodiment shown in FIG. 1 can be employed.

In order to assemble the stopper pin 18c, the plunger 12c is pushed inside, and the end parts 28c, 28c of the stopper pin 18c are hooked in the pin retaining hole 20c and on the front face 32, respectively. As an alternative, after one end part 28c of the stopper pin 18c is hooked in the pin retaining hole 20c, the stopper pin 18c is turned about the hooked end part 28c in such a manner that the other end part 28c is hooked on the front face 32 of the plunger 12c. Thus, the plunger 12c is prevented from thrusting out from the tensioner body 14c.

As described above, tensioners according to the present invention have structural features which enable easy assembly of a stopper pin onto a tensioner body and a part of the plunger under visual observation, which significantly enhances efficiency in the assembling work.

Obviously, various minor changes and modifications of the present invention are possible in the light of the above teaching. It is therefore to be understood that within the scope of the appended claims, the present invention may be practiced otherwise than as specifically described.

What is claimed is:

1. A tensioner comprising:
   a tensioner body having an outer surface;
   a plunger slidably mounted on the tensioner body and normally urged in an axial direction to project the front end of the plunger outward from the tensioner body; and
   a substantially U-shaped stopper pin having two opposite end parts hooked on a part of the tensioner body and a part of the plunger, respectively, to hold the plunger in position against movement in the direction to project from the tensioner body,
   said tensioner body having a pin retaining hole formed in said outer surface and extending perpendicularly to the axis of the plunger,
   said plunger having a pin retaining hole formed therein and extending perpendicularly to the axis of the plunger,
   one of said two opposite end parts being engaged in the pin retaining hole in the tensioner body, and the other of said two opposite end parts being engaged in the pin retaining hole in the plunger,
   said stopper pin being formed from a resilient metal wire, the pin retaining hole in the tensioner body having a diameter slightly larger than the diameter of said metal wire, and the retaining hole in the shoe being a rectangular hole much larger than the diameter of said metal wire.

2. A tensioner according to claim 1, wherein the plunger has a plastic shoe provided as an integral part on a front end of the plunger, said pin retaining hole of the plunger being formed In said shoe.

3. A tensioner according to claim 1, wherein, when the U-shaped stopper pin is in its free state, said opposite end parts are inclined toward each other.

4. A tensioner according to claim 3, wherein the U-shaped stopper pin further has a center part extending between the opposite end parts, the center part being spaced from the tensioner body and the shoe in a radial direction of the plunger.

5. A tensioner according to claim 1 wherein the opposite end parts of the stopper pin are parallel to each other.

6. A tensioner according to claim 5, wherein the U-shaped stopper pin further has a center part extending between the opposite end parts, the center part being spaced from the tensioner body and the plunger in a radial direction of the plunger.

7. A tensioner according to claim 1, wherein said plunger has a front end face extending perpendicularly to the axis of the plunger, the other end part of the U-shaped stopper pin being engaged on said front end face.

8. A tensioner according to claim 7, wherein the U-shaped stopper pin further has a center part extending between the opposite end parts, the center part being spaced from the tensioner body and the plunger in a radial direction of the plunger.

9. A tensioner according to claim 7, wherein, when the U-shaped stopper pin is in its free state, the opposite end parts of the stopper pin are inclined toward each other.

10. A tensioner according to claim 1, wherein the stopper pin has a center part extending between the opposite end parts, the center part being looped to form a ring-like pull tab.

* * * * *